May 4, 1926.
C. A. NOBIS
CREAMERY UTENSIL
Filed July 17, 1924
1,583,069
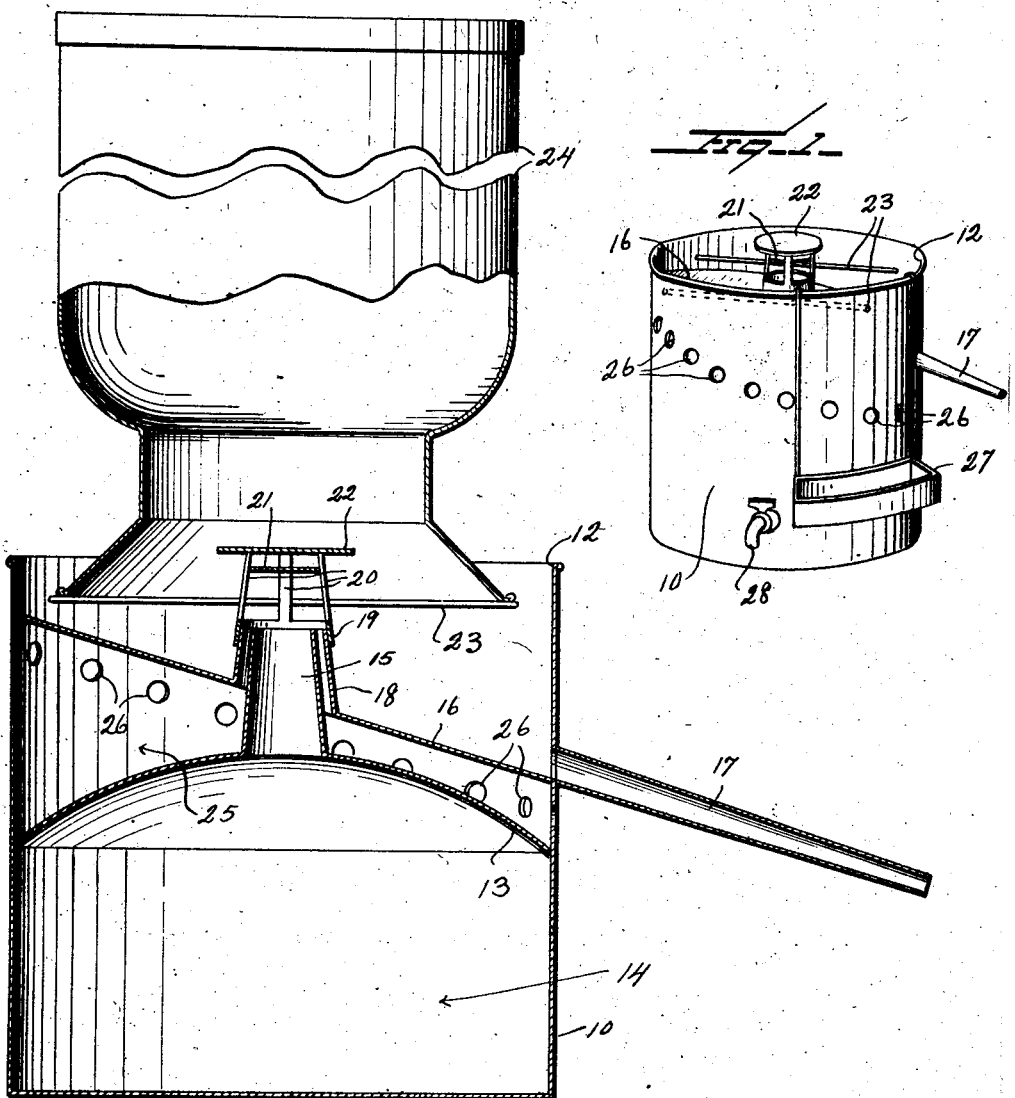
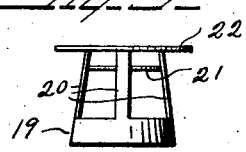
Inventor
C. A. Nobis
By Watson E. Coleman
Attorney Patented May 4, 1926.

1,583,069

UNITED STATES PATENT OFFICE.

CURTIS A. NOBIS, OF BARRY, ILLINOIS.

CREAMERY UTENSIL.

Application filed July 17, 1924. Serial No. 726,532.

*To all whom it may concern:*

Be it known that I, CURTIS A. NOBIS, a citizen of the United States, residing at Barry, in the county of Pike and State of Illinois, have invented certain new and useful Improvements in Creamery Utensils, of which the following is a specification, reference being had to the accompanying drawings.

This invention relates to creamery utensils, and more particularly to a device for use in cleansing milk and cream cans and in testing the contents thereof.

In the majority of localities the farmer or dairyman sells his product at what is known as a cream station, the product being delivered in cans which are collected from the farms or dairies each morning. The contents of each can must be separately tested, the can emptied and returned to the farmer or dairyman for use the following morning.

An important object of the invention is to provide a device of this character which is capable of use for simultaneously cleansing the can and making a test of the contents of the can to determine the quality thereof, which test, as well known to those familiar with the art, is usually conducted by heating a sample of the cream to a predetermined degree.

A further object of the invention is to provide a device of this character which may be conveniently operated from any type of stove and which accordingly may be very cheaply and conveniently operated.

A still further object of the invention is to provide a device for steaming cream cans so constructed that the butter-fat dripping from the can is not subjected to sufficient heat to cause the same to fry and smell and thus give an odor to the can.

These and other objects I attain by the construction shown in the accompanying drawings, wherein for the purpose of illustration is shown a preferred embodiment of my invention and wherein:—

Figure 1 is a perspective view of my improved utensil;

Figure 2 is a vertical sectional view through the utensil showing a creamery can inverted thereon, the can being partially in section;

Figure 3 is a side elevation of the spreader plate and its allied parts.

Referring now more particularly to the drawings, the device comprises a container 10 having intermediate its bottom 11 and open top 12 a partition 13 forming in the lower end of the casing a water compartment 14. The partition 13 is preferably domed and provided with a central upwardly extending trunco-conical outlet 15.

Within the can in spaced relation to the partition 13 is an inclined baffle 16 extending entirely across the can and communicating at its lower end with an outlet spout 17. This baffle is provided centrally with a trunco-conical spout 18 into which the upper end of the spout 15 extends. Seated upon this trunco-conical spout is an annulus 19 from which extend upwardly tapered legs 20 having secured thereto, adjacent their upper ends, a spreader plate 21 and at their upper ends a hood 22. Across the casing, immediately above the baffle 16, are arranged supporting rods 23 upon which a creamery can 24 may be disposed. The space 25 between the partition 13 and baffle 16 is in communication with the atmosphere exteriorly of the casing through openings 26 formed in the wall of the casing.

The exterior of the casing has removably secured thereto at that portion of the wall of the casing lying below the partition 13 a cup-shaped receptacle 27 into which a sample of the cream may be poured for testing. This receptacle is subjected to the heat from the compartment 14. This compartment has opening through its side wall a conveniently located drain-cock 28 through which hot water may be withdrawn for use from time to time. In the use of the device a portion of the cream can contents are first deposited in the receptacle 27. The can is then emptied and inverted over the trunco-conical spout 18, the casing having, of course, been placed upon a heater so that the fluid contained within the compartment 14 is giving off steam. This steam passes upwardly through the spout 15, engages against the spreader plate 21 and then passes upwardly into the can to cleanse the same. It will be noted that the can is in spaced relation to the inclined baffle 16 and accordingly air may circulate beneath this baffle, assuring cooling of the steam to such an extent that frying of the butter-fat upon the walls of the container is prevented, while at the same time sufficient heat is applied to cause these fats to melt and run down the sides of the can to fall upon the upper surface of the baffle and then pass outwardly through the spout 17. Any fats dripping downwardly are prevented from engaging the highly heated plate 21 by the hood 22, thus assuring against smoking of the can and butterfats at this point. Excessive heating of the baffle plate or the injection of too highly heated steam into the can is prevented by the air circulation openings 26 which permit passage of air not only beneath the baffle plate but about the trunco-conical spout 15.

Many changes being possible in the construction of the device as hereinbefore set forth without in any manner departing from the spirit of my invention, I do not limit myself to such specific structure except as hereinafter claimed.

I claim:—

1. A creamery utensil comprising a casing having an open top, a partition extending across the casing midway the ends thereof and forming in the lower end of the casing a water compartment, said partition having extending upwardly therefrom approximately centrally thereof a spout, a drain spout leading from one side of the casing above the partition, a baffle extending across the casing above the partition and inclining downwardly toward the drain spout, said baffle having a spout extending upwardly therefrom and into which the spout of the partition extends in spaced relation to the walls thereof, a spreader plate carried by the upper end of the spout of the baffle plate and overlying the upper end of the partition spout, and openings formed in the side wall of the casing between the baffle and partition.

2. A creamery utensil comprising a casing having an open top, a partition extending across the casing midway the ends thereof and forming in the lower end of the casing a water compartment, said partition having extending upwardly therefrom approximately centrally thereof a spout, a drain spout leading from one side of the casing above the partition, a baffle extending across the casing above the partition and inclining downwardly toward the drain spout, said baffle having a spout extending upwardly therefrom and into which the spout of the partition extends in spaced relation to the walls thereof, a spreader plate carried by the upper end of the spout of the baffle plate and overlying the upper end of the partition spout, a hood arranged above the upper end of the spreader plate, and means in the upper end of the casing for supporting a can in inverted position.

3. A creamery utensil adapted to be placed upon a heater and having at its upper end means for supporting a milk can in inverted position and at its lower end a water receptacle, means for directing steam formed upon heating of the vessel into the mouth of a can supported by the first named means, and means intermediate the first named means and water receptacle and insulated from the water receptacle for collecting butterfats heated and rendered fluid by the steam and delivering the same to the exterior of the utensil.

4. A creamery utensil adapted to be placed upon a heater and having at its upper end means for supporting a milk can in inverted position and at its lower end a water receptacle, a conduit for directing steam formed upon heating of the vessel into the mouth of a can supported by the first named means, a spreader plate associated with the mouth of the conduit and against which the steam is directed, a hood arranged above and spaced from the spreader plate and means intermediate the first named means and water receptacle and insulated from the water receptacle for collecting butterfats heated and rendered fluid by the steam and delivering the same to the exterior of the utensil.

In testimony whereof I hereunto affix my signature.

CURTIS A. NOBIS.